March 8, 1949.   H. O. ENGSTROM   2,463,859
THREADED LOCKING DEVICE
Filed July 25, 1945
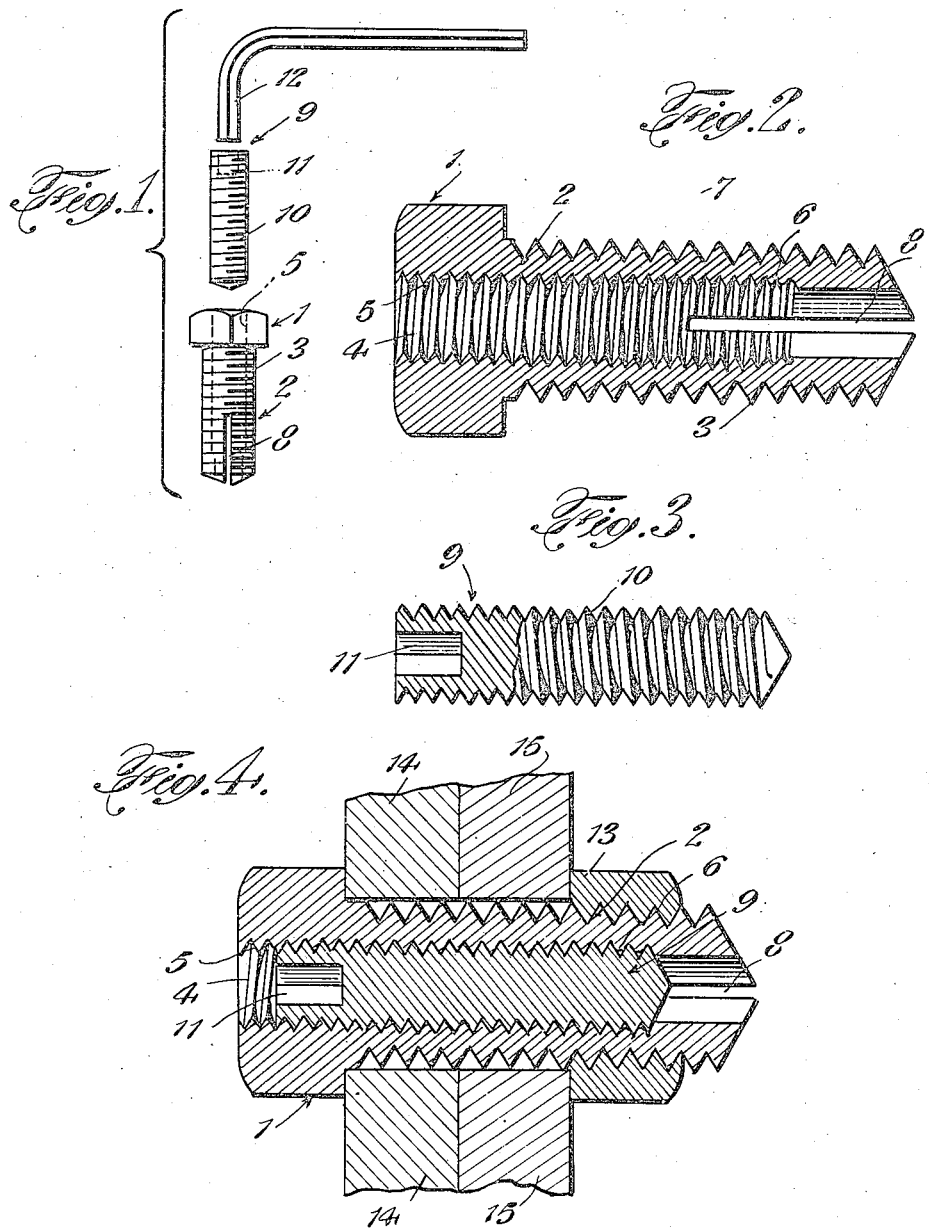
INVENTOR
Henry O Engstrom
BY
George T. Gill
ATTORNEY Patented Mar. 8, 1949

2,463,859

UNITED STATES PATENT OFFICE 2,463,859

THREADED LOCKING DEVICE

Henry O. Engstrom, New Canaan, Conn., assignor to Boots Aircraft Nut Corporation, New Canaan, Conn., a corporation of Delaware Application July 25, 1945, Serial No. 607,004

1 Claim. (Cl. 85—2)

The invention herein disclosed relates to a threaded locking device of a kind in which an expansible portion is provided for effecting, upon expansion, a tight, frictional threaded engagement between the thread thereof and the thread of a mating threaded element.

An object of the invention is to provide a threaded locking device of the kind mentioned in which the device may be brought into threaded engagement with a mating threaded element, tightened and then expanded to effect a locking force between the mating threaded elements. Another object of the invention is to provide a threaded locking device of this kind in which the locking force may be relieved when it is desired to loosen the mating threaded elements. A further object of the invention is to apply such a locking action to a threaded element such as a bolt or stud.

The foregoing objects and certain advantages of the invention that will hereinafter appear are realized in the embodiment of the invention illustrated in the accompanying drawing and described in detail below.

The drawing includes:

Fig. 1 which is an exploded view of a threaded bolt embodying the invention;

Fig. 2 which is an axial section of the bolt;

Fig. 3 which is an axial section of an expander; and

Fig. 4 which is an axial section of the bolt in locking threaded engagement with a nut.

The bolt illustrated in the drawing includes a head 1 of hexagonal outer configuration and a shank 2. The shank 2 is of lesser outer diameter than the distance between opposite flats of the hexagonal head 1. An external thread 3 is formed on the shank 2 and extends from the head 1 to the end of the shank. It is to be understood that the shank may be only partially threaded, the thread extending from the end to a point intermediate the end and the head, in a manner well known in the art.

The bolt is bored axially. Desirably, the bore 4 extends through the bolt from end to end. This bore is tapped to form a thread 5 therein extending from the head end of the bolt to a point 6 intermediate the head and the end of the shank. The bolt is slit from the threaded end thereof to a point or plane 7 beyond the end of the thread 5 to form a resilient, expansible portion extending from the plane 7 to the end of the bolt. Preferably, the slitting of the bolt is effected by opposite radial slots 8.

The thread 5 is formed by a tap. The entering end of the tap is, as taps are commonly made, tapered and the initial or entering threads of the ordinary tap do not cut a thread of full depth. Thus, when, as in the bolt illustrated, the tap is not run completely through the bore, the root diameter of the thread formed converges to the initial or drill diameter of the bore. This tapering or converging of the root diameter of the thread 5 takes place in the expansible portion of the bolt.

An expander in the form of a stud 9 is provided for effecting expansion of the expansible portion of the bolt. This stud is receivable in the axial bore of the bolt and has a full thread 10 thereon, extending from end to end of the stud, of a size and pitch to mate with the thread 5. One end of the stud 9 has a wrench socket 11 formed therein to receive a wrenching tool 12.

In Fig. 4 of the drawing, the assembled threaded locking device is shown in threaded, and locking engagement with a nut 13. This nut, however, is merely representative of a mating threaded element as the bolt is equally efficacious in threaded engagement with a tapped hole in a casting, for example. That is, as will be more clearly apparent from the following description of the operation of the threaded locking device illustrated, the threaded locking device of this invention is operative independently of the kind or nature of the mating threaded element with which it may be used.

When the bolt illustrated is entered in a mating threaded element, such for example as the nut 13, the stud or expander 9 is backed out of the bore to such position that the inner or entering end thereof is separated or spaced from the tapering portion of the thread 5. In this position of the expander 9, the expansible portion of the shank 2 is in its normally contracted position. The bolt thus enters the mating threaded element with the freedom and looseness of the nut and bolt having the usual and common thread tolerances. In this relation the bolt is drawn home, for example, to securely fasten two plates 14 and 14 together. As there is no locking force effective while the bolt is drawn home, the feel or torque will be the same as with an ordinary nut and bolt.

After the bolt is drawn home to the specified torque or the feel of the experienced mechanic, the locking arrangement is then utilized to lock the mating threaded elements in the tightened position. This is done by threading the expander 9 into the bolt. The bolt is of such length, not very critical, that the mating threaded element comes to rest on the expansible portion of the bolt. As the expander is threaded into the expansible portion with the wrenching tool 12, its thread moves into the portion of the thread 5, in the expansible portion of the bolt, where the root diameter of the thread 5 converges. In this manner, the expansible portion of the bolt is expanded, the threads thereof are forced into wedging, frictional engagement with the threads of the mating threaded element, and a static force is set up between the mating threads of such magnitude as to resist relative movement of the mating threaded elements due to forces acting thereon and resulting from vibration and shock ordinarily encountered in service—even such service as effects rapid, periodic axial forces transmitted through the mating threaded elements.

When, for the purposes of repair or replacement, it becomes necessary to loosen or remove the threaded locking device above described, the lock is first released and then the mating threaded elements react in the manner of those having normal, common, commercial thread tolerances. To this end the wrench 12 is utilized to back off or out the expander 9. The expansible portion of the bolt then returns, by virtue of its resiliency, to its normal contracted position. With the locking force thus removed or released, the mating threaded elements may then be unthreaded in the manner, and with the same torque as an ordinary mating threaded element having the usual thread tolerances.

From the foregoing description of the threaded locking device illustrated in the drawing as an example of an embodiment of this invention, it will be obvious that various changes, modifications and adaptations of the invention may be made by those skilled in the art without departing from the principle or scope of the invention as expressed in the appended claim.

I claim:

A threaded locking device of the kind described comprising a threaded shank of substantially uniform diameter having an axial bore of substantially uniform diameter therethrough and being split longitudinally thereof from one end to a point intermediate the ends thereof to provide a radially expansible portion, a thread formed in the axial bore and extending into the expansible portion of the shank, and having a gradually diminishing root diameter within the expansible portion of the shank, and a threaded expander receivable in the bore in threaded engagement with the thread therein, the expander having a thread of uniform root diameter whereby on engagement with the thread within the expansible portion of the shank, the shank is expanded.

HENRY O. ENGSTROM.

REFERENCES CITED

The following references are of record in the file of this patent:

UNITED STATES PATENTS

| Number | Name | Date |
|---|---|---|
| 1,296,374 | Droege et al. | Mar. 4, 1919 |

FOREIGN PATENTS

| Number | Country | Date |
|---|---|---|
| 739,089 | France | Oct. 24, 1932 |